United States Patent [19]

Christopher, Todd J. et al.

[11] 4,195,309
[45] Mar. 25, 1980

[54] VIDEO PROCESSING SYSTEM INCLUDING COMB FILTERS

[75] Inventors: Christopher, Todd J., Indianapolis, Ind.; Larry L. Tretter, Poughkeepsie, N.Y.

[73] Assignee: RCA Corporation, New York, N.Y.

[21] Appl. No.: 966,512

[22] Filed: Dec. 4, 1978

[51] Int. Cl.$^2$ .................... H04N 9/535; H04N 5/79
[52] U.S. Cl. .......................... 358/31; 358/8
[58] Field of Search .................. 358/8, 11, 31, 38; 360/36

[56] References Cited

U.S. PATENT DOCUMENTS

| 3,996,606 | 12/1976 | Pritchard | 358/21 |
| 3,996,610 | 12/1976 | Kawamoto | 358/31 |
| 4,100,567 | 7/1978 | Yoshinaka | 358/8 |

OTHER PUBLICATIONS

Rhodes, "The Video Disc Player", *RCA Review*, vol. 39, Mar. 1978, pp. 198-221.

*Primary Examiner*—John C. Martin
*Attorney, Agent, or Firm*—E. M. Whitacre; J. S. Tripoli

[57] ABSTRACT

In a video processing system including comb filters for separating interleaved luminance and chrominance components, the time of occurrence of the color synchronizing component of the composite color video signal is detected after the comb filtering and separating of the luminance and chrominance components. The composite signal components include spurious frequency variations which accompany the composite signal during playback from a video disc. A first phase locked loop coupled to a frequency translator is used to remove the spurious frequency variations from the separated and frequency translated chrominance components. A second phase locked loop is connected between a second frequency translator and a clock controlled delay line. The second phase locked loop tracks the spurious frequency variations in a manner to assure that accurate combing of the component signals occurs at the output of the comb filters. The same reference frequency is used in the first phase locked loop as well as in the second frequency translator.

14 Claims, 1 Drawing Figure

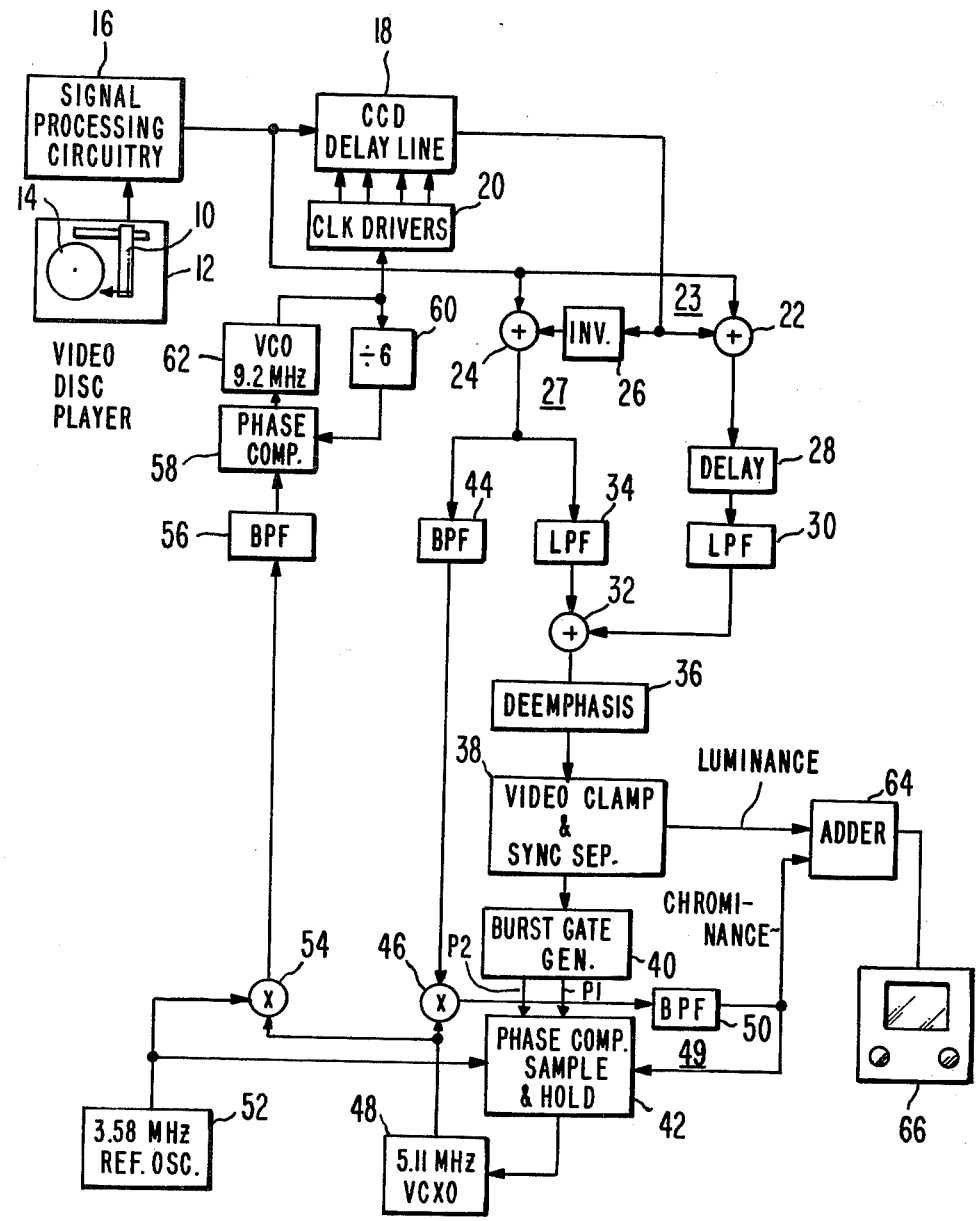

VIDEO PROCESSING SYSTEM INCLUDING COMB FILTERS

The present invention relates generally to video signal processing systems and more particularly to apparatus for comb filtering and rearranging the luminance and chrominance signal components of a composite video signal from one format to another. This is accomplished accurately despite the occurrence of spurious variations of the composite signal frequencies.

An illustrative embodiment, where application of the principles of the present invention is particularly advantageous, is a playback system for a video record, such as, for example, a player for a video record of the disc type as described in U.S. Pat. No. 3,842,194, issued to J. K. Clemens on Oct. 15, 1974. In the operation of such a video disc player, failure to precisely maintain the proper speed of rotation of the disc can result in a sustained shift of the recovered signal frequencies from their proper values. Additionally, the presence of such factors as eccentricity of the disc record's information track relative to the center of rotation of the disc, and warps in the disc record's surface, can result in cyclical variations of relative motion between the pickup and the disc track which cause spurious fluctuations of the recovered signal frequencies, the fluctuations recurring at rates corresponding to the disc rotation frequency and harmonics thereof.

While the video disc player desirably may incorporate error reducing apparatus, such as a turntable synchronizing system of the type described in U.S. Pat. No. 3,912,283, issued to J. L. Hammond, et al., on Oct. 14, 1975, to oppose errors in the average speed of disc rotation and a pickup position adjusting system of the "arm stretcher" type disclosed in U.S. Pat. No. 3,711,641, issued to R. C. Palmer on Jan. 16, 1973, to oppose the cyclical variations in pickup/disc relative motion, residual errors in the recovered signal frequencies are still likely to be encountered.

Such recovered signal frequency errors pose a problem when the nature of the recorded signal format calls for the use of comb filtering in the player's processing of the recovered signals. For example, U.S. Pat. No. 3,872,498, issued on Mar. 18, 1975 to D. H. Pritchard, discloses a signal format establishing a composite color video signal in a so-called "buried subcarrier" form, a format which, as explained therein, is particularly advantageous for video disc record use. In the format proposed by Pritchard, chrominance information is represented by a modulated color subcarrier, of the general form employed in the well-known NTSC system. However, the chrominance component is not located in the high end of the luminance signal video band, as in the NTSC system, but rather is buried in a lower portion of the video band; an illustrative subcarrier frequency choice is in the vicinity of 1.53 MHz, with the color subcarrier side bands extending ±500 KHz thereabout, and with the luminance signal band extending well above the highest color subcarrier side band frequency (to 3 MHz for example). By suitably offsetting the subcarrier frequency from an integral multiple of the line frequency associated with the video signal (e.g., choosing the subcarrier frequency to equal 195/2 times the line frequency), and by effecting suitably complementary comb filtering of the respective luminance and chrominance signals prior to their combination, one may form, for recording purposes, a composite signal having its midband shared by luminance and chrominance components, without deleterious crosstalk introduced in the forming process. However, as also disclosed in the Pritchard patent, it is appropriate, in apparatus for playback of the record bearing color picture information in the aforesaid buried subcarrier format, to use comb filtering to obtain from the recovered composite signals (1) the recorded luminance signal substantially free of the buried chrominance components, and (2) the recorded chrominance information substantially free of the luminance components. In such use of comb filtering in the record playback system, the presence of frequency errors in the recovered composite signals (due to such causes as previously discussed) may interfere with the attainment of the desired degree of separation of the respective luminance and chrominance components.

In U.S. Pat. No. 3,996,606 issued to D. H. Pritchard on Dec. 7, 1976, a comb filter arrangement employing a clock control delay line, such as one of the so-called CCD (charge coupled device) type, is disclosed as suitable for use with the aforementioned comb filtering function in a record playback system. The frequency of the clock signals applied to the delay line in the arrangement disclosed in the last-mentioned Pritchard patent, is rendered responsive to the frequency errors of the recovered, composite signals so as to vary the delay imparted by the delay line in a manner which tends to compensate for frequency errors. As a consequence, shifts of the multiple peaks and the multiple rejection notches of the frequency response characteristics of the player's comb filters occur with a sense and timing in agreement with the sense and timing of spurious shifts of the constituent frequencies of the recovered component signals. But, the amount of shift in the peaks and notches is less than the shift in frequency of the recovered signal. This occurs because the frequency of the clock signals is the sum of two frequencies, one of which reflects the variations in the signal frequencies, while the other is fixed.

In U.S. Pat. No. 3,996,610 issued to H. Kawamoto on Dec. 7, 1976, there is disclosed another arrangement providing comb filter apparatus wherein a variable delay is provided through the utilization of a CCD type delay line. The delay of the CCD device is controlled in response to signals provided from the oscillator of a phase locked loop. The phase locked loop follows the frequency variations of a reference signal component, which is disclosed therein as the color synchronizing burst, which is detected from the signal recovered from the video disc record. This arrangement therefore requires an additional phase locked loop which extracts timing information from the color burst, for the sole purpose of controlling the CCD device. Also shown as FIG. 2, in the Kawamoto patent, is an arrangement where the color burst responsive phase locked loop which is normally required to convert and stabilize the color frequency is subsequently eliminated.

In the last-mentioned Pritchard patent and in the Kawamoto patent both arrangements are suitable for providing a control signal to the controllable delay line in a sense which tends to compensate for the spurious frequency variations in order to provide a more accurate separation of the chrominance and luminance components in the comb filters. In both cases, the spurious frequency variations are detected from the color synchronizing burst recovered from the video disc record.

The Pritchard arrangement does not completely compensate for the spurious frequency variations. For the specific frequencies described therein, the variation in the frequencies of the comb filter peaks and notches is only 3/10 of the variation in the constituent frequencies of the recovered signal components.

The Kawamoto arrangement does provide essentially complete compensation, but the form shown in FIG. 1 thereof requires an additional phase locked loop comprised of a color burst gate, a phase comparator, and a very stable and accurate voltage controlled oscillator. The oscillator must be precisely controlled to avoid the possibility of "side lock", a well-known problem encountered when locking a phase locked loop to a synchronizing signal having a low duty cycle pulse nature, such as the color synchronizing burst.

In accordance with the present invention, an arrangement is shown which provides essentially perfect matching of the comb filter characteristics to the frequencies of the recovered signal components, as does the Kawamoto arrangement, but without the need for an additional phase locked loop to extract the color burst information and the attendant complexity.

This is accomplished by utilizing the output of the oscillator which is conventionally used to mix or heterodyne the separated chrominance information for the purpose of frequency translating the chrominance signal to the usual location in the NTSC signal. Additionally, a signal from the existent fixed reference oscillator which determines the frequency of the converted chrominance information is utilized. By combining these two oscillator signals in a mixing or heterodyning process, a signal is produced having a frequency equal to the difference between the two oscillator frequencies, which is essentially identical to the color burst frequency of the signal recovered from the disc and having the same spurious frequency variations. This signal, being continuous with essentially constant amplitude, can then be easily multiplied in frequency by a number of well-known techniques (e.g., a nonlinear device and a filter, or a phase locked loop containing a frequency divider) to produce the necessary clock frequency for the CCD device. In this fashion, the combing of the filters is very accurately controlled despite the presence of spurious frequency components in the recovered composite signal. The separated chrominance component with any spurious frequency components associated therewith substantially removed is then combined with the separated luminance signal to form the standard NTSC composite signal.

In accordance with the present invention, a system is provided for processing composite color video signals including a luminance component occupying a given band of frequencies and a chrominance component interleaved with the luminance component over a portion of the given band and inclusive of a color synchronizing component. The composite color video signal components are concomitantly subject to spurious frequency variations. The processing system comprises a means for receiving the composite color video signals. A controllable delay means is coupled to the receiving means for imparting a controllable amount of delay to the received composite color video signals. A first comb filter means, which includes means for subtractively combining signals provided by the delay means and the receiving means, is then provided. A second comb filter means, which includes means for additively combining the signals provided by the delay means and the receiving means, is also provided. A frequency reference means is used to provide a fixed reference frequency. A first means is provided for frequency translating the output of the first comb filter means to a frequency substantially equal to the reference frequency. A second means is provided which responds to the reference frequency means and to the frequency translated signal for supplying an output signal including any residual spurious frequency variations to the frequency translating means whereby the spurious variations in frequency are substantially reduced in the frequency translated signal. A third means, which is coupled to the second means and to the reference frequency means, is utilized for providing an output signal at a nominal frequency and including the spurious frequency variations. A means which is coupled between the third means and the controllable delay means is responsive to the output signal of the third means for varying the delay imparted by the delay means concomitantly with the spurious frequency variations in a sense establishing an inverse relationship between the spurious frequency variations and the concomitant delay variations. Finally, means are provided for combining the output signals from the second comb filter means and the first means for providing an output composite color video signal.

In the drawing:

The sole FIGURE illustrates a record playback system employing a comb filter arrangement in a video processing system embodying the principles of the present invention.

Referring to the FIGURE, a signal pickup arm structure 10 of a video disc player 12 (illustratively of the type disclosed in the aforementioned Clemens patent) is arranged to sense color picture information recorded in a spiral information track, when record 14 is rotated and arm 10 is moved radially across record 14.

Pickup arm 10 is coupled to an input of signal processing circuitry 16, which serves to derive a composite color video signal from the sensed information. Illustratively, the composite video signal output of processing circuitry 16 is in a buried subcarrier format as previously discussed. The luminance component occupies a frequency band extending from 0 to about 3 MHz. The chrominance component comprises a modulated color subcarrier, with the subcarrier frequency falling in a portion of the luminance component frequency band (e.g., in the vicinity of 1.53 MHz) at an odd integral multiple of half the line frequency with side bands extending thereabout ±500 KHz. The composite signal also includes conventional deflection synchronization pulses, as well as a color synchronizing signal comprising bursts of the color subcarrier frequency appearing during the back porch portion of the recurring horizontal blanking intervals.

During the process of transferring the recorded color picture information from disc record 14 to signal processing circuitry 16, the failure to precisely maintain the proper rotation speed of the record 14 can effect a sustained shift of the recovered composite video signal frequencies from their proper values. Also, the existence of such conditions as eccentricities of the information track of disc record 14 relative to the center of rotation of record 14, and warps of the surface of the record 14, can produce cyclical variations of relative motion between pickup arm 10 and the information tracks on record 14 of a magnitude such that spurious fluctuations of the recovered composite signal frequencies occur, the fluctuations recurring at rates corresponding to the rotation frequency of record 14 and harmonics thereof.

The composite color video signal output of signal processing circuitry 16 is provided at an analog input terminal of a clock controlled delay line 18, which is, for example, a CCD delay line of the buried channel type (e.g., as described in the article by J. Matov, entitled "CHARGE COUPLED DEVICES" and appearing in the January 1975 issue of Wireless World). The delay provided by CCD delay line 18 is controlled by signals provided from clock drivers 20. The clock driver circuit 20 responds to a signal provided thereto and splits the incoming signal into two 180° out-of-phase clock pulse signals and a plurality of drivers responding thereto develop suitably phased clock input signals to the delay line 18. The signals provided from the clock driver circuit 20 are coupled to the appropriate clock terminals of the CCD delay line 18. CCD delay line 18 is used to provide a delay to the composite signal received from the signal processing circuitry 16, which delay varies in concert with the spurious fluctuations of the composite signal frequencies as will be subsequently explained.

The composite video signal is transferred through CCD delay line 18 in the form of incremental charges in potential wells created at or near the surface of a semiconductor. The clock input signals coupled to the clock terminals of CCD delay line 18 are employed to move the charges along the semiconductor surface from potential well to potential well, in a desired direction of signal flow. The transition time for the signals passing through CCD delay line 18 is directly proportional to the number of charge-transfer elements contained in the device and inversely proportional to the clock frequency of the pulses provided from the clock drivers 20. For application of this invention, the number of charge transfer elements contained in CCD delay line 10 is selected so that when the CCD delay line 18 receives clock pulses from the clock drivers 20 at the nominal oscillating frequency provided to the clock drivers 20, the composite video signal being transferred experiences a delay substantially corresponding to one period at the nominal horizontal line frequency for the composite video signal (i.e., one period at the line frequency developed in the absence of any time base errors).

The input composite video signal provided at the analog signal input terminal of delay line 18 and the signal provided at the analog signal output terminal of delay line 18 are coupled to a first signal combiner 22 where these two signals are additively combined. Delay line 18 and combiner 22 form a comb filter 23 which desirably separates the luminance component from the composite color video signal. When the clock frequency supplied to clock drivers 20 is at the nominal frequency (indicative of no spurious deviations of the composite signal frequencies), this luminance comb filter 23 has a frequency response characterized by multiple response peaks falling at even multiples of half the nominal line frequency and multiple rejection notches falling at odd integral multiples of half the nominal line frequency.

The input signal to delay line 18 is also coupled to another combiner 24. The output signal of delay line 18 is coupled to an inverter 26. The output signal of inverter 26 is then coupled to another input terminal of signal combiner 24. Delay line 18, in combination with inverter 26 and combiner 24, form another comb filter 27 which desirably passes the chrominance component of the composite video signal. When clocking of the delay line 18 occurs at the nominal operating clock frequency (in the absence of time base errors) this chrominance comb filter 27 has a frequency response characteristic having multiple response peaks falling at odd integral multiples of half the nominal line frequency and multiple rejection notches falling at even integral multiples of half the nominal line frequency. Thus, in respect of the chrominance signal component, inverter 26 in combination with combiner 24 provides a mechanism for subtractively combining the delayed and undelayed versions of the composite color video signal provided from the signal processing circuitry 16.

The output of the luminance comb filter 23 is applied via a delay circuit 28 providing a delay of about 500 ns, and a low pass filter 30, having a 0–5 MHz pass band, to the input terminal of another combiner 32. The output signal from the chrominance comb filter 27 is applied via a low pass filter 34 to another input terminal of combiner 32. This combining process which takes place in combiner 32 serves to supplement the luminance comb filter output with luminance information relating to vertical detail (rejected in the luminance comb filter 23 in the course of chrominance component removal, but available at the output of the chrominance comb filter 27). A pass band of 0–500 KHz, for example, for low pass filter 34 permits restoration of a reasonably adequate amount of vertical detail. Delay circuit 28 is interposed between combiners 22 and 32 to substantially match the delay introduced in the separated chrominance channel so that the luminance components and the chrominance components will be properly phased when they are eventually recombined.

The output signal from combiner 32 is provided at an input terminal of a deemphasis network 36. Deemphasis network 36 is provided to compensate for signal preemphasis which was performed during the recording of the information signals in particular areas of the frequency band. The output signals from deemphasis network 36 are then provided to a video clamp and sync separator circuit 38. The video clamp and sync separator circuit 38 provides at one output terminal the separated luminance component of the composite color video signal with the sync tips clamped at a level of about 7 volts. At another output terminal of circuit 38 there is provided horizontal sync pulses derived from the output signals from the luminance comb filter 23.

The extracted horizontal sync pulses are coupled to a burst gate generator 40. Burst gate generator 40 responds to the occurrence of horizontal sync pulses to provide timing pulses to a phase detector, sample and hold circuit 42 so that the color burst synchronizing signal may be separated from the chrominance information.

The output signals from the chrominance comb filter 27 are applied from combiner 24 via a band pass filter 44 (having a pass band of 1 MHz centered at 1.53 MHz) to one input terminal to a mixer 46. A voltage controlled crystal oscillator, whose output frequency is controlled by the signals developed in the phase comparator, sample and hold circuit 42 has its output signals provided to a second input terminal of mixer 46.

The phase detector, sample and hold circuit 42, voltage controlled oscillator 48, mixer 46, and band pass filter 50 together comprise a phase locked loop 49 which translates the 1.53 MHz chrominance signal from filter 44 to a 3.58 MHz chrominance signal at the output of filter 50, which has its color synchronizing burst phase locked to reference crystal oscillator 52, and is thereby stabilized in frequency and phase.

The nominal operating frequency of VCO 48 is chosen to match the sum of the nominal buried subcarrier frequency and the desired output subcarrier frequency. Illustratively, the desired output subcarrier frequency corresponds to the NTSC subcarrier value of 3,579,545 Hz, whereby the desired value for the nominal operating frequency of VCO 48 falls at approximately 5.11 MHz. It will be recalled that the buried subcarrier frequency which is provided at the output of the chroma comb filter 27 is approximately 1.53 MHz. The operation of mixer 46 thus provides an output chrominance component at about 3.58 MHz to band pass filter 50. Band pass filter 50 has a pass band of 1 MHz centered at about 3.58 MHz.

The output signal from band pass filter 50 is applied to one input terminal of phase comparator, sample and hold circuit 42. Another input signal is provided from a crystal controlled reference oscillator 52 to another input terminal of phase comparator, sample and hold circuit 42. The reference oscillator 52 provides signals at a fixed frequency of 3.58 MHz. Phase comparator, sample and hold circuit 42 compares the phase of the reference signal with the phase of the signal provided at the output of band pass filter 50 at certain specified times. In response to pulses from the burst gate generator 40, the phase comparator, sample and hold circuit 42 is operated to sample the signals at the output of band pass filter 50, at times corresponding to the occurrence of the color burst synchronization component at the filter output terminal, and, to phase compare the color burst component to a signal from reference oscillator 52 and then provide an error signal to controlled oscillator 48 for the remainder of the time duration of the horizontal line.

When the phase locked loop 49 is in lock, the frequency of the 3.58 MHz color synchronizing burst signal at the output of filter 50 must be essentially identical to the frequency of reference oscillator 52. Since the frequency of the color burst signal at the output of filter 50 is equal to the difference between the frequency of controlled oscillator 48 and the frequency of the color burst signal at the output of filter 44, this implies that the frequency of controlled oscillator 48 must be essentially identical to the sum of the frequency of reference oscillator 52 and the frequency of the 1.53 MHz color burst signal at the output of filter 44, including any spurious frequency variations present in the 1.53 MHz color signal.

A second mixer 54 is also provided. Mixer 54 receives one input signal from the 3.58 MHz reference oscillator 52 and another input signal from the controlled oscillator 48. It will be recalled that the frequency of the signal provided by the controlled oscillator 48 is essentially identical to the sum of the frequency of reference oscillator 52 and the frequency of the separated 1.53 MHz chrominance signal. The result of the heterodyne operation in mixer 54 is an output signal provided at 1.53 MHz which is essentially identical to the frequency of the separated chrominance signal including any spurious frequency variations which are present. The output signal from mixer 54 is applied to band pass filter 56. Band pass filter 56 has a 200 KHz pass band centered at 1.53 MHz. The output signals from band pass filter 56 are then provided to one input of a phase comparator 58. The other input to phase comparator 58 is provided from a frequency divider circuit 60. The output signals from phase comparator 58 are provided at the input of a voltage controlled oscillator 62. The output signals from VCO 62 are provided at the input terminal of frequency divider circuit 60 as well as at the input of the clock drivers 20. Phase comparator 58, voltage controlled oscillator 62, and divider 60 comprise a phase locked loop which frequency multiplies the 1.53 MHz output of filter 56 by 6. The output frequency of VCO 62 is thereby at a nominal 9.2 MHz. When this signal is divided by divider circuit 60, a signal at approximately 1.53 MHz is provided at the phase comparator from the divider circuit 60. Phase comparator 58 then compares the phase of the signals from the mixer 54 with the signals from the divider circuit 60. The signals provided from mixer 54 include the spurious frequency variations. Therefore, phase comparator 58 provides an error signal to VCO 62 responsive to the spurious frequency variations. This component in the output of VCO 62 is used to adjust the delay of delay line 18 in a manner which will provide very accurate comb filtering.

When a time base error occurs in the record playback process that produces, illustratively, a given percentage shift upward of the frequency of the color burst reference signal component, the increase in frequency of the color burst reference signal is detected in the comparator circuit 42 and results in an increase frequency in the controlled oscillator 48 which in turn causes an increase in the frequency of VCO 62 via the operation of phase comparator 58. The increase in frequency in the VCO 62 causes a reduction of the delay provided by the delay line 18. Again, the delay provided by delay line 18 is inversely proportional to the clock frequency. The reduced delay is equal to a period at a frequency corresponding to the nominal line frequency shifted upward by the given percentage. Thus, the characteristic of the luminance comb filter 23 formed by the delay line 18 and the combiner 22 experiences a similar percentage upward shift of the respective response peaks and rejection notches. If a downward shift of frequency is encountered in the color burst reference signal component, then the direction of the corresponding percentage shifts of the peak and notch frequencies in the luminance comb filter 23 is also downward. Similarly, the peak and notch frequencies of the chrominance comb filter 27 are shifted in the same manner as described above with reference to the luminance comb filter 23 when time base errors occur.

It will now be seen that the arrangement shown in the figure provides both accurate comb filtering as well as a stabilized chrominance output signal even in the face of time base errors causing spurious frequency variations to be generated during the record playback process.

The luminance signal which is provided at an output of the video clamp and sync separator circuit 38 and the frequency translated chrominance signal which is provided at the output of band pass filter 50 are each coupled to an adder circuit 64. As shown in the figure, the luminance signal output from combiner 24 is also included in the overall luminance output signal from the video clamp and sync separator circuit 38 via the operation of low pass filter 34 and combiner 32. The output signal from adder 64 is a reconstructed composite video signal in a form suitable for acceptance by a color television receiver 66 to effect reproduction of the recorded color pictures. Where it is desired to apply the recorded information to the receiver via its antenna terminals, the application may be effected by a suitable transmitter apparatus, such as shown, for example, in U.S. Pat. No. 3,775,555 issued to D. J. Carlson on November 27, 1973.

What is claimed is:

1. A system for processing composite color video signals including a luminance component occupying a given band of frequencies and a chrominance component interleaved with said luminance component over a portion of said given band and inclusive of a color synchronizing component, said composite color video signal components being concomitantly subject to spurious frequency variations; said system comprising:
   means for receiving said composite color video signals;
   controllable delay means coupled to said receiving means for imparting a controllable amount of delay to said composite color video signals;
   first comb filter means including means for subtractively combining signals provided by said delay means and said receiving means;
   second comb filter means including means for additively combining signals provided by said delay means and said receiving means;
   frequency reference means for providing a fixed reference frequency;
   first means for frequency translating the output of said first comb filter means to a frequency substantially equal to the reference frequency;
   second means, responsive to said reference frequency means and to said frequency translated signal for providing an output signal including said spurious frequency variations to said frequency translating means, whereby said spurious frequency variations are substantially reduced in said frequency translated signal;
   third means coupled to said second means and said reference frequency means for providing an output signal at a nominal frequency and including said spurious frequency variations;
   means, coupled between said third means and said controllable delay means and responsive to said third means output signal for varying the delay imparted by said delay means concomitantly with said spurious frequency variations in a sense establishing an inverse relationship between said spurious frequency variations and the concomitant delay variations; and
   means for combining the output signals from said second comb filter means and said first means for providing an output composite color video signal.

2. The system according to claim 1 wherein said first means includes a mixer responsive to said second means output signal and to the output of said first comb filter means.

3. The system according to claim 2 wherein said second means in conjunction with said first means together comprise a phase locked loop, said second means comprising:
   a controlled oscillator; and
   a phase comparator;
   said phase comparator being responsive to said reference frequency means and to said output of said first means providing an error signal for driving said controlled oscillator, said controlled oscillator providing said second means output signal.

4. The system according to claim 3 wherein said third means comprises a second mixer responsive to said reference frequency means and to said controlled oscillator input signal for providing said output signal at said nominal frequency including said spurious frequency variations.

5. The system according to claim 4 wherein said delay varying means comprises another phase locked loop comprising:
   another controlled oscillator;
   another phase comparator; and
   a frequency divider;
   said other phase comparator being responsive to said third means output signal and to the output of said frequency divider for providing a drive signal to said other controlled oscillator, said frequency divider being connected between said other controlled oscillator and said other phase comparator.

6. The system according to claim 5 wherein said controllable delay means comprises a clock controlled charge transfer device having an analog signal input terminal coupled to said receiving means, an analog signal output terminal coupled to said first and second comb filter combining means and a clock signal input terminal responsive to the output signals from said other controlled oscillator.

7. The system according to claim 6 further comprising a low pass filter responsive to the output of said first comb filter means and a combiner means for combining the output of said low pass filter with the output of said second comb filter means.

8. A system for processing composite color video signals including a luminance component occupying a given band of frequencies and a chrominance component interleaved with said luminance component over a portion of said given band and inclusive of a color synchronizing component, said composite color video signal components being concomitantly subject to spurious frequency variations; said system comprising:
   means for receiving said composite color video signals;
   controllable delay means coupled to said receiving means for imparting a controllable amount of delay to said composite color video signals;
   first comb filter means, including means for subtractively combining signals provided by said delay means and said receiving means for filtering said composite color video signals in accordance with a first comb filter characteristic having multiple rejection notches falling at a first plurality of spaced frequencies;
   second comb filter means, including means for additively combining signals provided by said delay means and said receiving means, for filtering said composite color video signals in accordance with a second comb filter characteristic having multiple rejection notches falling at a second plurality of frequencies interleaved with said first plurality of spaced frequencies;
   frequency reference means for providing a fixed reference frequency;
   a first phase comparator means;
   a controlled oscillator means;
   first frequency translating means, responsive to the output of said first comb filter means and the output of said controlled oscillator means for frequency translating components of said composite color video signals passed by said first comb filter means to a frequency substantially equal to said reference frequency;

said first phase comparator means being responsive to the output of said frequency reference means and the output of said first frequency translating means for providing a driving signal to said controlled oscillator means, said controlled oscillator means providing an output signal including said spurious frequency variations whereby said spurious frequency variations are substantially reduced in the output of said first frequency translating means;

second frequency translating means, responsive to the output of said frequency reference means and the output of said controlled oscillator means, for providing a second frequency translated signal including said spurious frequency variations;

means responsive to the output of said second frequency translating means and coupled to said controllable delay means, for varying the delay imparted thereby concomitantly with said spurious frequency variations and in a sense establishing an inverse relationship between said spurious frequency variations and the concomitant delay variations so as to cause variations of said first and second pluralities of spaced frequencies of said comb filter characteristics in consonance with the sense and timing of said spurious frequency variations of said composite color video signal components; and adder means, responsive to the outputs of said second comb filter means and said first frequency translating means for forming an output composite color video signal.

9. The system according to claim 8 wherein said first frequency translating means comprises a mixer.

10. The system according to claim 9 wherein said second frequency translating means comprises a second mixer.

11. The system according to claim 10 wherein said means for varying the delay of said controllable delay means comprises a phase locked loop comprising:
another controlled oscillator;
another phase comparator; and
a frequency divider;
said other phase comparator being responsive to the output of said second mixer and to the output of said frequency divider for providing a drive signal related to the phase difference between the signals applied to said other phase comparator, said drive signal being provided to said other controlled oscillator, said frequency divider being coupled between said other controlled oscillator and said other phase comparator.

12. The system according to claim 11 wherein said controllable delay means comprises a clock controlled charge transfer device having an analog signal input terminal coupled to said receiving means, an analog signal output terminal coupled to said first and second comb filter combining means and a clock signal input terminal responsive to the output of said other controlled oscillator.

13. The system according to claim 12 further comprising a low pass filter responsive to the output of said first comb filter means and a combiner means for combining the output of said low pass filter with the output of said second comb filter means.

14. The system according to claim 13 wherein said first phase comparator means compares the phase of the output of said frequency reference means with the phase of the output of said first frequency translating means at times corresponding to the occurrence of said color synchronizing components.

* * * * *